United States Patent

[11] 3,604,902

[72] Inventor Irwin Munt
 Elizabeth, N.J.
[21] Appl. No. 813,506
[22] Filed Apr. 4, 1969
[45] Patented Sept. 14, 1971
[73] Assignee Weston Instruments, Inc.
 Newark, N.J.

[54] APPARATUS FOR ELIMINATING FLICKER IN A DRIVEN DISPLAY
 5 Claims, 9 Drawing Figs.

[52] U.S. Cl. ................................................ 235/92 EA,
 235/92 R, 235/92 LG
[51] Int. Cl. .................................................. H03k 21/18,
 G09f 9/00
[50] Field of Search .......................................... 235/92;
 315/84.5, 84.6

[56] References Cited
 UNITED STATES PATENTS
 2,851,596 9/1958 Hilton ........................... 235/92 (29 TF)
 3,109,928 11/1963 Stuart ............................ 235/92 (65)
 3,307,143 2/1967 Wyse et al. ................... 235/92 (65)
 3,395,268 7/1968 Barton .......................... 235/92 (65)

OTHER REFERENCES
Handbook of Automation Computation and Control, Volume 2, 1959, Edited by Grabbe, Ramo, Wooldridge, page 1608 and 1609.

*Primary Examiner*—Maynard R. Wilbur
*Assistant Examiner*—Joseph M. Thesz, Jr.
*Attorneys*—William R. Sherman, Stewart F. Moore and Jerry M. Presson ABSTRACT: The state of a display-controlling (or driving) binary counter is synchronized to the state of the display controlled thereby. A time-varying signal alternately extinguishes and excites (strobes) the display and the phase of this signal is used to control the operation of the counter such that the counter does not change state significantly until the display is extinguished. The counter state is controlled by the state of a resistor-capacitor (RC) monostable multivibrator, which in turn, is synchronized while in an unstable state to the time-varying signal. Synchronization is conveniently effected by utilizing the capacitor of the multivibrator to integrate the time-varying signal and using the resulting integrated signal to trigger the monostable into a stable state.

3,604,902

APPARATUS FOR ELIMINATING FLICKER IN A DRIVEN DISPLAY

This invention relates to an apparatus for providing a nonflickering, representative display of the state of a display-controlling apparatus, and has particular utility in digital voltmeters of the type which display the digital output of a counter to provide a digital representation of the voltage magnitude under measurement.

In prior art display systems, and especially in displays which are utilized by digital voltmeters, it is conventional practice to electrically interpose storage circuits or units between the display and the outputs of a display-driving counter. In digital voltmeter applications, the counter typically takes the form of a pulse counter driven by clock pulses from a suitable clock pulse-generating source, such as an oscillator. The display often takes the form of decimal display tubes which may be fired to provide a representative illuminated display in the form of a decimal number, for example, of the corresponding state of the driving counter and hence this type of display will be described as exemplary. However, as is well known in the art, the display may also take various other forms, such as, digit wheel printout devices, luminescent devices, cathode-ray tubes to mention but a few.

With the counter driven by clock pulses the state of the counter, and hence the voltage outputs thereof, change as a function of time. Consequently, if the display is coupled directly to the counter outputs without buffering storage units the changing voltage outputs of the counter cause the display to change at the rate the counter is driven. Since the counter is typically driven at a high rate of speed the ever-changing display appears to the human eye as an unintelligible flickering blur of constantly changing decimal numbers. This type of penetration is sometimes annoying to one viewing the display.

To obviate this problem one or more storage units are conventionally interposed between the counter or counting stages thereof and the display. The buffering storage units receives the binary-coded decimal voltage outputs of the counter, either directly, or more generally, from conventional decoding circuits which translate the binary-coded decimal counter output voltages into a representative numerical output voltage. The storage unit may be appropriately excited when it is desired to display the state of the counter or counting stage associated therewith in representative form and is normally excited for a sufficient length of time to provide a substantially nonflickering display which remains constant at least long enough to be recognized by the human eye. While storage units serve this purpose well, the use of such units increases substantially the cost of displaying the parameter under measurement.

The recent thrust of the digital voltmeter art has been toward the development of small-sized, economical and reliable instruments. U.S. Pat. application Ser. No. 813,507 filed Apr. 4 1969. of A. T. Kelly and J. Nagy, Jr., entitled Analog-Digital COnverters, assigned to the assignee of this application and hereinafter referred to as "said copending application," discloses various embodiments of this type of voltmeter. As disclosed in said copending application, buffer storage units may be eliminated by permitting the counter means to stabilize upon termination of a conversion cycle and thereby provide unchanging counter outputs to drive the display. However, the display flickering during conversion cycles when the counter is being driven. Manifestly, for some industrial applications it may be requisite to wholly eliminate display flickering and yet not resort to conventional but relatively expensive expedients, such as buffering storage circuits or conventional synchronizing circuit arrangements which, although employed to dispense with buffer storage circuits, typically do not fully utilize circuitry which may be already available in the digital voltmeter for more than its originally contemplated purpose. Thus, resort to the latter expedient in low-cost digital voltmeters, and especially in digital voltmeters disclosed in said copending application, would result in increases in the complexity and cost of the instrument, and moreover, may require a substantial modification of the instrument and/or the operation thereof.

Accordingly, this invention has as an objective a new and improved system for providing a representative display of the state of a display-controlling apparatus wherein the display does not reflect by flickering significant changes in the state of said apparatus, the system being readily adaptable to certain types of existing apparatus wherein display flicker is undesired.

Another object of this invention is to provide apparatus which may be relatively easily and inexpensively used in conjunction with storage circuitry currently utilized by certain types of measuring instruments, and especially low-cost digital voltmeters, to provide an intermittent, representative and essentially nonflickering display of the signal under measurement.

Yet another object of this invention s to provide circuitry which uniquely utilizes a capacitor of a resistor capacitor type of monostable multivibrator to synchronize the state of a display-driving counter to a time-varying display excitation signal such that flickering of the driven display is essentially eliminated.

Still another object of this invention is to provide a system for modifying a resistance-capacitance time constant of a monostable device having stable and unstable states, whereby the transition of the device from the unstable to the stable state is essentially synchronized to a time-varying signal.

Yet another object of this invention is to modify a low-cost signal conversion instrument and particularly an instrument of the type disclosed in said copending application, so that a capacitor in a resistance-capacitance monostable multivibrator serves to synchronize a signal-counting cycle to a time-varying signal such as line voltage.

IN accordance with the instant invention one or more time intervals during which a display is illuminated or otherwise activated by a time-varying excitation signal to display the desired information is interleaved with time intervals during which the display is extinguished. The state of the display is synchronized by means of a monostable device to the state of a display-driving pulse counter or vice versa, such during the former time intervals the counter is inhibited from changing state and during the latter intervals is permitted to change state.

Implementation of the instant invention is most readily and easily and therefore, preferably affected in those systems where the transmission of pulses to the counter is controlled by the state of a monostable device of the type wherein the time required to charge a capacitor to some predetermined thereshold-triggering level determines the time during which the device remains in the unstable state. The capacitor is charged to said threshold level by the display excitation signal having waveform portions which are respectively below and above a minimum level of excitation needed to illuminate or otherwise cause a discernible change in display state. When the capacitor changes to said threshold level, which typically requires a plurality of successive cycles of the excitation signal, the monostable device is triggered into its stable state whereupon pulse transmission to the counter is initiated. The relationship between the charging of the capacitor to said threshold level and corresponding levels of the excitation signal is such that the display is activated for one or more cycles of the excitation signal while the capacitor charges toward said threshold level and is extinguished before the capacitor attains said threshold level and hence before the counting process is stated. The time-varying excitation signal is conveniently an essentially sinusoidal signal obtained after suitable amplitude reduction from a commonly available 60 Hz. 110- volt line.

In the environment of the voltmeters disclosed in said copending application and in other applications to which the principles of the instant invention pertain, the capacitor serves as memory or storage means because by charging, the capacitor is, in effect, remembering that the monostable has been triggered from the stable to the unstable state. In accordance with the principles of the instant invention, the capacitor when connected by a resistor to the time-varying display excitation signal, forms an integrating circuit for the time-varying signal. The output of the integrating circuit is in synchronism with the time-varying signal and is utilized to trigger the monostable into the stable state substantially coincidentally with a predetermined level, and more specifically a level below threshold excitation, of the display-excitation signal. This dual utilization of the capacitor which permits the desired synchronization between the respective changing and stabilized states of the counter and the respective extinguished and activated states of the display may be achieved with minimum modification of the instrument circuitry and without significantly increasing instrument cost.

FOr a better understanding of the instant invention together with other and further objects thereof, reference may be had to the following description taken in connection with the accompanying drawings, the scope of the invention being pointed out in the appended claims. Referring to the drawings:

FIG. 1 illustrates partially in schematic and partially in block form one representative application of the instant invention to an analog-to-digital converter, and more specifically to a low-cost digital voltmeter;

FIGS. 2A–2G, inclusive, illustrate typical waveforms which appear at correspondingly identified points on FIG. 1; and FIG. 2H illustrates the waveform components which combine to form a composite portion of the waveform of FIG. 2F.

In order to facilitate an understanding of the instant invention an exemplary embodiment of the digital voltmeter disclosed in said copending application will be described initially followed by a detailed description of the instant invention and the applicability thereof to said digital voltmeter.

DESCRIPTION OF A DIGITAL VOLTMETER
WHICH MAY UTILIZE THE INSTANT INVENTION

Referring now to FIG. 1, there is illustrated one embodiment of an analog-to-digital converter, and more specifically a low-cost digital voltmeter as disclosed by said copending application. This low-cost instrument, herein simply referred to as a voltmeter, includes a conventional single-ended input operational amplifier 10 that characteristically has a high input and a low output impedance and a high negative voltage gain, designated -A. Voltage gains on the order of 50,000 and greater are typically obtainable with this type of amplifier. An analog voltage signal $E_{IN}$ of unknown magnitude is applied to the signal-inverting terminal of the amplifier and a reference voltage of greater magnitude and opposite polarity to the analog signal is applied to that same terminal.

The signal $E_{IN}$ is typically a DC or a relatively slow time-varying signal having a magnitude which is to be displayed in digital form.

Referring again to FIG. 1, the analog voltage $E_{IN}$ is received at a converter input terminal 11 and converted into an analog input current $I_{IN}$ by an input resistor $R_{IN}$ connected between the terminal 11 and a current summing junction 12. The value of the analog current $I_{IN}$ is equal to $E_{IN}/R_{IN}$ and the junction 12 is connected to the signal-inverting terminal of the amplifier 10.

Amplifier output terminal 13, at which amplifier output voltage $E_o$ appears, is coupled to the junction 12 by first and second parallel, negative feedback circuits which individually supply a high amount of feedback to the amplifier input and thus maintain a virtual ground potential at the junction 12. The first feedback circuit is principally resistive in nature and comprises series-connected resistors R1 and R2 and the second feedback circuit is principally capacitive in nature and comprises an integrating capacitor C. The resistors R1 and R2 have a tapped junction 14 to which a reference voltage $E_R$ of opposite polarity to the input voltage $E_{IN}$ is selectively applied by closure of a switching device S1 coupled between the source $E_R$ and the junction 14. The corresponding reference current, $I_R=E_{ER}/R_1$, of sufficient magnitude to discharge the capacitor C to a predetermined level, typically zero volts, within a prescribed time interval, designated $T_X$ in FIG. 2A, is applied to the junction 14 when the device S1 is closed. The reference voltage $E_R$ is a precisely regulated DC voltage. Since the capacitor C typically charges for a longer time than that provided for discharging the capacitor to some predetermined potential level and because the current derived from the reference voltage is utilized to discharge the capacitor, the magnitude of the current $I_R$ is typically several times that of the desired full scale value of the analog input current $I_{IN}$. For positive values of $E_{IN}$ the polarity of the reference voltage $E_R$ is negative, and vice versa.

The switch S1 typically comprises a solid state switching device, such as a transistor, which may be driven selectively from a nonconductive or essentially open circuit state to a saturated or essentially closed circuit state, FIG. 2B, upon application of a suitable switching signal to an appropriate control terminal. The switching signals are sharp or step voltage transitions from one DC level to another of sufficient magnitude to drive the transistor into a nonconductive or into a saturated state, depending upon the direction of the voltage transition.

A bistable multivibrator or flip-flop 15 produces respective positive and negative-going step voltage transitions of sufficient magnitude to change the state of the switch S1 when the bistable is triggered to change state. The step voltage transitions are transmitted by a conductor 16 to the switch S1. The bistable 15 has two input leads, designated SET and RESET, corresponding respectively to its two possible stable states. In response to a suitable triggering signal, FIG. 2C, received from the detector 18 via the RESET lead the bistable 15 changes from the SET to the RESET state whereupon the output of the bistable goes sharply to a level which will open the switch S1. When the bistable is driven back to the SET state by a triggering signal applied to the SET lead, the output of the bistable goes sharply in an opposite direction to a level which will close the switch S1.

The detector 18 may comprise a conventional comparator-amplifier circuit having some predetermined threshold detection level. Inasmuch as a zero-volt detection level is readily obtainable with such circuits by connecting one o input to ground potential, the detection level of the detector 18 will hereinafter be assumed toe zero volts. The other input of the comparator circuit is coupled to terminal 13 so that a magnitude comparison may be made between the instantaneous output voltage $E_o$ and zero volts.

The detector should be capable of producing an output signal of sufficient magnitude and of proper polarity to coincidentally trigger the multivibrator 15 into its RESET state when the voltage $E_o$ exceeds the established detection level.

A slight voltage overshoot of the detection level by the generated ramp normally occurs because of the inability of the system to respond instantaneously to zero-crossing by the generated ramp. The slight overshoot is depicted in FIG. 2A as joining the ramp 41 and the waveform 42 and normally has a spike waveform, which after amplification may be used as the multivibrator trigger signal, FIG. 2C.

The trigger signal from detector 18, in addition to triggering the bistable 15 into its RESET state, is coincidentally applied to an input 19 of a one-shot or monostable multivibrator 20, to simultaneously trigger the one-shot into an unstable state from whence it reverts, after a time delay, to its previous or stable state. The output signals obtained from the one-shot 20 when the one-shot switches into the unstable state and when it switches back into the stable state are respective, coincidental first and second oppositely directed sharp voltage transitions having a time of separation equal to the time of return of the one-shot to its stable state. Numeral 21 designates an exemplary voltage waveform produced by the one-shot. The width of the more positive pulse portion of this waveform is determined by the time delay of the one-shot or correspondingly, the time interval during which the one-shot remains in its unstable state. This time interval is at least long enough to permit the capacitor C to charge to a potential which is proportional to the magnitude of the voltage $E_{IN}$.

The pulse 21 controls the state of a coincidence gate 22 and thus the flow of clock pulses from a clock 23 to counting stages of pulse counting means 24. MOre specifically, the gate 22 is disabled and blocks clock pulse flow to the counting means when the leading edge of pulse 21 is received by the gate.

Conversely, the gate 22 is enabled by the trailing edge of pulse 21 to pass clock pulses to the counting means and remains enabled until it is again disabled by the leading edge of the next-received pulse 21. Since it has been assumed that the gate-disabling leading edge of the output pulse 21 is positive-going, the gate 22 may be an inverting AND (or NAND) gate. Because the leading edge of pulse 21 is produced practically coincidentally with the multivibrator trigger signal from the detector 18 and since the leading edge of the latter signal is produced coincidentally by the zero crossing of the ramp portion $E_o$, the gate 22 is disabled each time and at substantially the same instant that $E_o$ crosses zero volts. MOreover, since the gate 22 is enabled a predetermined time thereafter by the trailing edge of pulse 21, the gate remains disabled for a time interval equal to the time delay of the one-shot 20.

The counting means 24 comprises a plurality of binary-coded decimal counters, and typically decade counters, connected in tandem. The number of counters employed is generally governed by the resolution desired on in the measurement. For the purpose of simplifying as much as possible the description, the converter is depicted as including only two decade counters 24A and 24B. Clock pulses are first counted by the counter 24A which is coupled directly to the gate 22 and provides the least-significant or units binary-coded decimal output. When the counter 24A is filled to capacity, it produces a full scale or overflow output signal to the most significant, and in this case the ten's decade counter 24B, to advance this latter counter once. The number of times the ten's counter is advanced therefore depends upon the number of times the units counter recycles during a conversion cycle.

The binary-coded decimal (BCD) count in the counters 24A and 24B may be translated into voltages which represent an equivalent decimal number by operation of conventional BCD-to-decimal decode circuits 25A, 25B. The voltage outputs at the decode circuits drive the display apparatus 26A, 26B which often takes the form of decimal number display tubes. In such case, and assuming both counters 24A and 25B are decade counters filled to count capacity, the pulse count in the counters in binary-coded decimal form is instantly decoded by the circuits 25A, 25B, respectively, and displayed by the tubes 26A, 26B, respectively, as decimal number 99. The next clock pulse received by the counter 24A will cause all stages in both counters to reset or clear and generate an overflow or carry signal from the highest order counter 24B. This overflow signal is taken off by the SET lead to trigger the bistable 15 into its SET state, whereupon the switch S1 is closed. All outputs from the counters 24A and 24B are then zero value outputs corresponding to displayed decimal numbers 00 and in the time domain, FIG. 2A, to the instants of generation ($T_x=0$) of the ramp portions 41 and 44 of the voltage $E_o$. The time $T_x$ required a corresponding ramp portion 41 or 44 to cross zero volts is counted by the counting means until level crossing of $E_o$ is detected by the detector 18.

The full scale recycling of the counters 24A and 24B therefore determines, by way of triggering the bistable 15 into the SET state, the instant of closing the switch S1 and the application of the reference voltage $E_R$ to the junction 14 to initiate the generation of the ramp $E_o$. Since the counters reinitiate counting when the gate 22 is enabled by the termination of the time delay of the one-shot 20, the time increment between the disabling of the gate 22 and the application of a SET triggering pulse to the bistable 15 depends upon the frequency of the clock 23, the number of stages connected in tandem to form the counting means 24 and the count which was accumulated by the counters at the instant the gate 22 is enabled. This time increment is of course additional to the time delay provided by the one-shot 20. However, because the clock 23 is usually operated at high frequency, for example,0.5 mHz, the counting means 24 fills to capacity at a high rate of speed and the additional time increment is normally negligible compared to the time delay provided by the one-shot 20. This additional time increment serves to delay slightly the application of a SET trigger pulse and correspondingly the length of time the switch S1 is held open by the bistable 15 and therefore, merely increases slightly the length of time that the capacitor C remains at a steady state charged condition.

For reasons disclosed in said copending application of A. T. Kelly and J. Nagy, Jr., the aforedescribed digital voltmeter operates as follows to display in representative digital form the magnitude of the voltage $E_{IN}$. Assuming that the ramp portion 41 of the waveform $E_o$ has just crossed zero volta, the detector 18 senses this crossing and in response thereto produces an output signal, FIG. 2C, which triggers the one-shot 20 into its unstable state and simultaneously resets the bistable 15. When the one-shot 20 switches into its unstable state a sharp voltage transition is produced at the one-shot output which disables the gate 22, whereupon the gate acts to block the flow of pulses from the clock 23 to the counting means 24. The counting means 24 stabilizes and drives the display 26A, 26B to display the decimal value of the voltage signal under measurement. When RESET, the bistable 15 produces a sharp output voltage transition which opens the switch S1 and allows the capacitor C to charge to a potential proportional to the analog signal magnitude, this potential level being, for example, the steady state level 40 in FIG. 2A, if there has been no change in magnitude of the analog input signal between conversion cycles.

While in its unstable state, the one-shot 20 prevents the switch S1 from closing until a steady state voltage appears across the capacitor C which is directly proportional to the analog signal magnitude. The capacitor C typically charges exponentially to a steady state condition, as depicted by the portion of the curve in FIG. 2A designated 42.

Upon the time-delayed return of the one-shot 20 to its stable state, the gate 23 is enabled by a sharp change in the output voltage of the one-shot to transmit pulses from the clock 23 to the counting means 24. The counting means 24 now advances until an overflow signal is produced which is transmitted to the bistable 15 via the SET lead and thereby triggers the bistable 15 so that the latter switches from its RESET into its SET state.

When the bistable 15 switches into its SET state the resulting sharp voltage transition, which appears as an oppositely directed voltage at the bistable output is applied via the conductor 16 to the switch S1 causing the switch S1 to close and initiate the essentially constant discharge of the capacitor C coincidentally with a predetermined, and typically zero, count in the counting means 24. The constant discharging of the capacitor C, by way of a reference current derived from source $E_R$,generates the ramp portion 44 of the voltage $E_o$, FIG. 2A, at the amplifier output terminal 13. Since the bistable 15 is typically triggered into its SET state during a recycling transition of the counting means 24, the coincidental predetermined binary-coded decimal number is typically represented by a decimal number consisting of one or more 0 digits, depending upon the required resolution of the displayed number and correspondingly the number of counting stages employed by the counting means 24. The counting means 24 then counts the total number of clock pulses received from the clock 23 during the time interval required to discharge the capacitor C to zero volts. The number of pulses counted until zero crossing of the generated ramp reoccurs provides a digital representation of the voltage signal then under measurement.

Having now completed a description of an exemplary digital voltmeter known to me, the nature and application of my invention to this voltmeter will now be disclosed.

DETAILED DESCRIPTION OF THE INSTANT INVENTION

Figure 1:
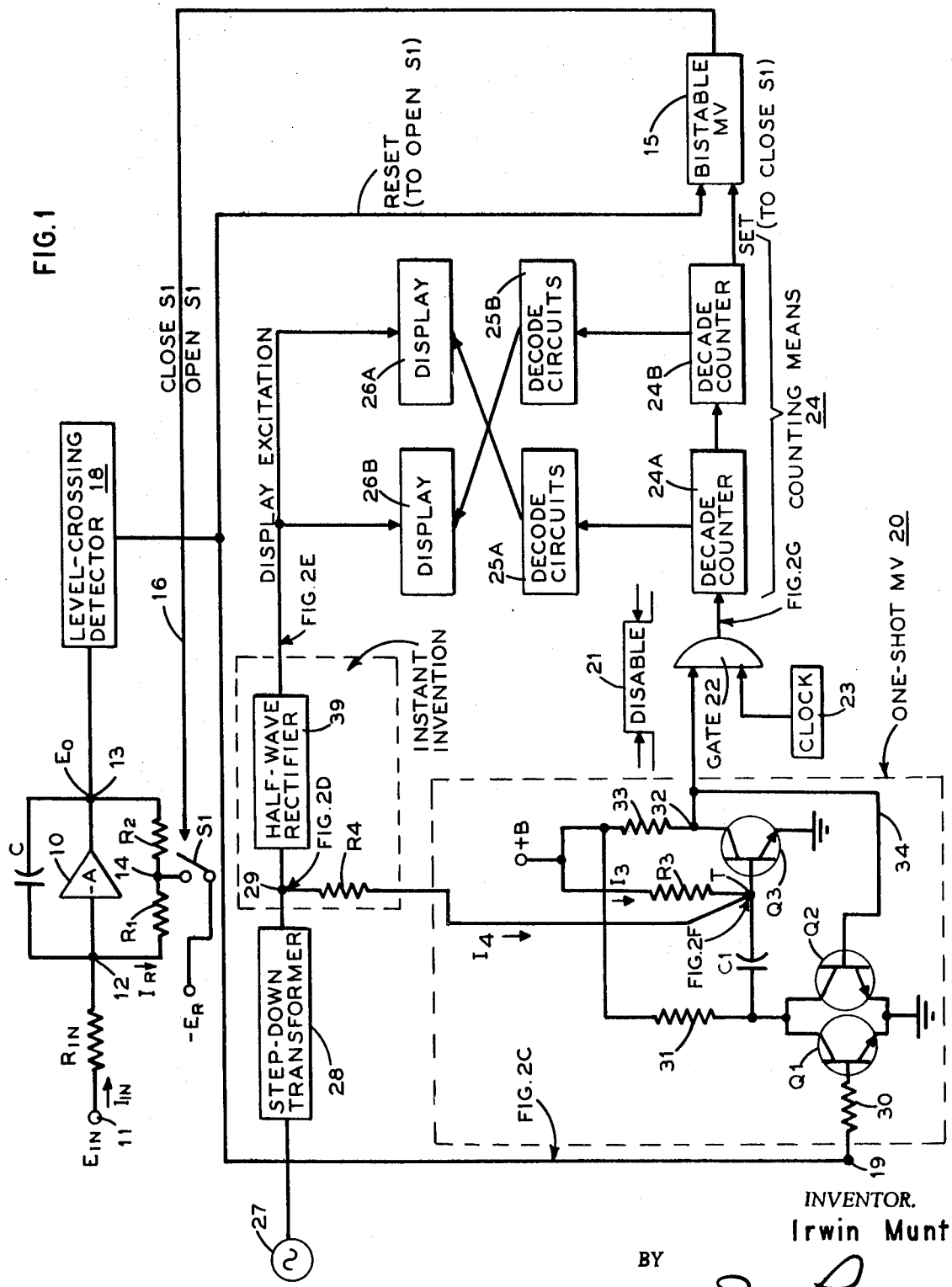

Referring again to FIG. 1 of the drawing, that schematic portion of the hereinabove described one-shot which is conventional, appears within a block delineated by broken lines and referred to by the numeral 20. In accordance with the instant invention, the time-delayed return of the one-shot to its stable state is at least substantially synchronized to a time-varying display excitation signal having portions thereof below the threshold level required to fire or otherwise effect the desired display; the synchronism being such that the one-shot reverts to its stable state, and remains in this state, while the excitation signal is below said threshold level. The excitation signal is conveniently obtained from a readily available 60 cycle AC source 27 after being stepped-down in amplitude by a conventional stepdown transformer 28. The transformer 28 is usually employed in digital voltmeters to reduce the amplitude suitable for powering various components such as the clock 23 and the counter 24.

Figure 2:
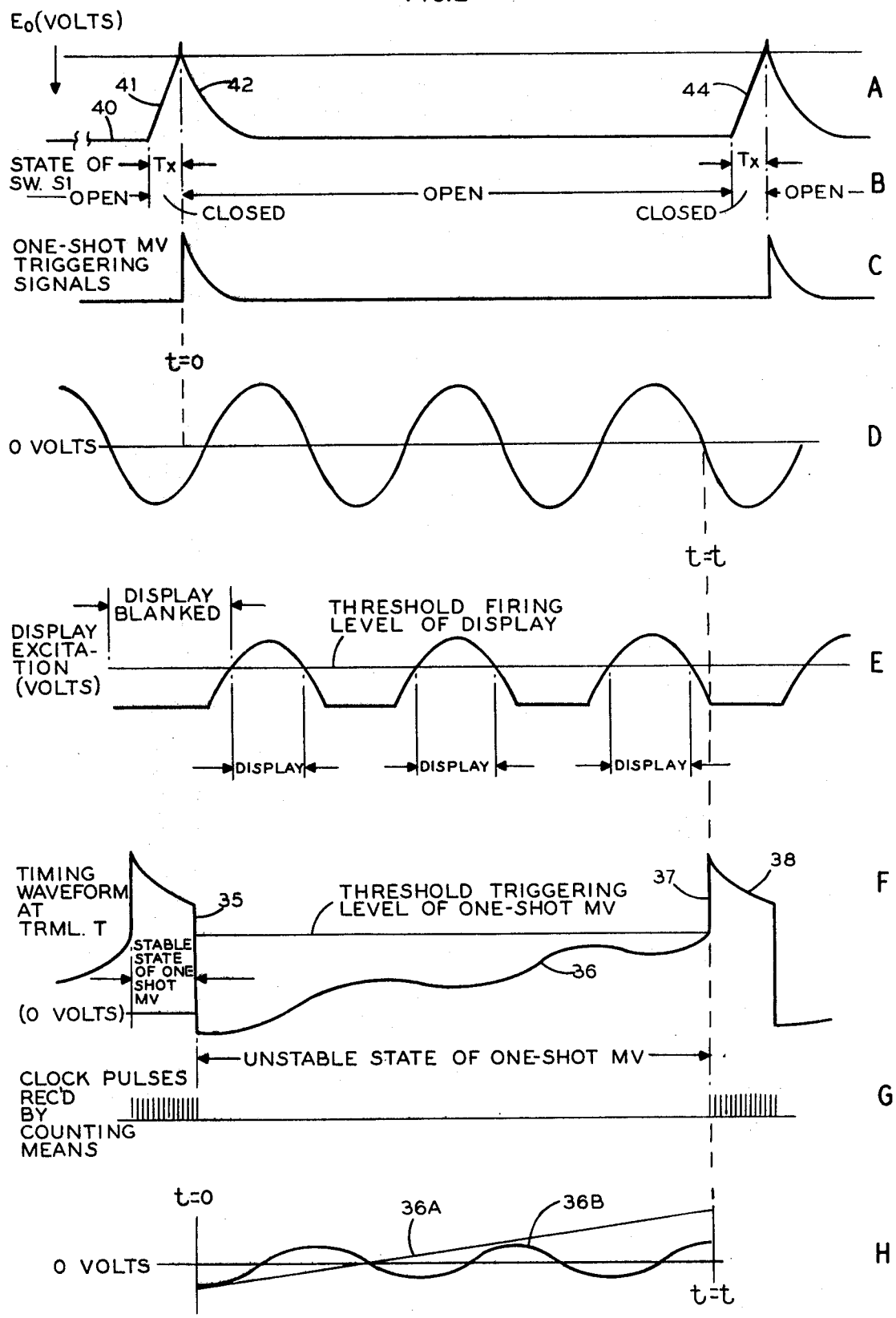

FIG. 2D illustrates a typical sinusoidal voltage waveform which appears at the output of the transformer 28 and hence at a terminal 29. The terminal 29, along with a resistor R4 and a half-wave rectifier 39 are enclosed by a broken line block, designated INSTANT INVENTION, to more clearly distinguish one embodiment of my system from said copending application. The resistor R4 converts the sinusoidal voltage into a sinusoidal current $I_4$ which flows toward a terminal T. At the terminal T the time integral of the time-varying signal is superimposed upon (or algebraically added to) the time integral of a DC signal obtained from a DC voltage source of +B volts by way of a resistor R3 and the composite signal is utilized as a timing waveform which determines the length of time the one-shot 20 remains in its unstable state. The resulting DC current flow toward the terminal T is designated $I_3$. The magnitude of $I_3$ is substantially greater, for example, 20 times greater, than the peak amplitude of the time varying current $I_4$.

As discussed above, the application of a triggering pulse, FIG. 2C, to terminal 19 drives the one-shot into its unstable state. The terminal 19 is connected through base resistor 30 to the base junction of transistor Q1. Transistors Q1 and Q2 are of the same conductivity type (NPN) and have their emitter junctions clamped to ground potential. The collectors of the transistors Q1 and Q2 are commonly connected to one plate, that is, the left plate as viewed in FIG. 1, of an integrating capacitor C1 and to one end of a collector resistor 32, the other end of resistor 32 receiving DC voltage from the source +B. Transistor Q3, connected in a grounded emitter configuration, has its base junction connected to the terminal T and its collector connected via terminal 32 to one input of the gate 22; to one end of resistor 33; and through feedback loop 34, to the base of transistor Q2.

When the one-shot 20 is in its stable state the transistor Q3 is rendered fully conductive by the net DC current supplied to the terminal T from the source +B by way of the resistor R3, the polarity of this current being positive with respect to ground potential. While the transistor Q3 remains fully conductive the potential at terminal 32 is less than the minimum positive base-to-emitter voltage needed to forward bias the transistor Q2 into conduction. Transistor Q1 is also in a nonconductive state because the quiescent output signal received from the detector 18 will now be at, or near, ground potential and hence its base and emitter junctions will be at practically the same potential. If the detector 18 is of a type which does not produce a quiescent signal which will render Q1 nonconductive then a differentiating circuit may be coupled between the detector output and the resistor 30. In such case the differentiator may be a conventional RC differentiator (not shown) having a capacitor in series with the resistor 30 and a resistor coupling an appropriate plate of the capacitor to ground potential. Ground tracing through this resistor maintains the transistor Q1 in a nonconductive state.

While the transistors Q1 and Q2 are nonconductive, the voltage appearing at the common collector terminal of both transistors will be at some positive level with respect to ground as determined by the source +B and the resistor 31. This voltage is typically between 1 and 2 volts. While the transistor Q3 remains conductive, the potential at terminal 32 will be lower than that required to disable the gate 22. As long as the one-shot 20 remains in its stable state the transistor Q3 conducts heavily and clock pulses from the clock 23 pass through the gate 22 to the counting means 24. FIGS. 2G and 2F may be compared to facilitate an understanding of the relationship between the states of the one-shot 20 and the time intervals during which clock pulses are received by the counting means 24.

The potential at the terminal 32 remains at a gate-enabling level until the one-shot 20 is triggered into its unstable state. The application of a positive pulse, FIG. 2C, to the base of transistor Q1 causes the transistor to saturate or turn on with the result that the collector voltage of Q1 drops sharply to practically ground potential. The sharp negative-going voltage transition is passed without significant delay by the capacitor C1, because the capacitor C1 cannot respond to instantaneous changes in voltage levels and drives the potential at the terminal T from a level of, for example, +0.8 volt at which it is clamped by conduction of the transistor Q3 to a level slightly negative with respect to ground potential, for example, to −0.2 volt. The sharp drop in potential level at the terminal T is indicated by the numeral 35 in FIG. 2F and appears at the terminal T to reverse bias the transistor Q3 into a nonconductive or turned-off state. Consequently, the potential at terminal 32 goes sharply more positive to a level sufficient to disable the gate 22 and to forward bias the transistor Q2 into full conduction. The left plate of the capacitor C1 is now clamped at practically ground potential by conduction of the transistor Q2.

With the left plate of the capacitor C1 at ground potential the capacitor is charged by two currents, namely the time-varying current $I_4$ and the considerably larger magnitude DC current $I_3$. The resistor R4 and the capacitor C1 form an integrating circuit for the time-varying current $I_4$ whereas the resistor R3 and the capacitor C1 form an integrating circuit for the current $I_3$. The voltage which appears at the terminal T, since it is tied to the right plate of the capacitor C1, is a composite voltage obtained by algebraically summing the time integrals of the currents $I_3$ and $I_4$. The following equations define the relationship between the voltage $V_T$ at the terminal T and the currents $I_3$ and $I_4$.

$$V_T = V_i + \frac{1}{C1}\int_{t=0}^{t=t}(I_3+I_4)dt \quad (1)$$

wherein $V_i$ is the initial and typically slightly negative voltage at terminal T produced when the one-shot 20 is triggered into its unstable state, the limits of integration from $t=0$ to $t=t$ define the time that the one-shot 20 remains in its unstable state, and $I_4$ is the time-varying current.

Assuming that $I_4$ is a sinusoidal current then, $$V_T = V_i + \frac{1}{C1}\int_{t=0}^{t=t}(I_3+I'_4 \sin \omega t)dt \quad (2)$$

where $I'_4$ is the peak value of $I_4$.

Performing the integration in equation (2), $$V_T = V_i + \frac{I_3 t}{C1} - \frac{I'_4 \cos \omega t}{\omega C1} \quad (3)$$

Referring to FIG. 2H, the voltage across capacitor C1 and hence at the terminal T which increases linearly with time, $I_3 t/C1$, is depicted by waveform 36A and the superimposed voltage component at terminal T that varies periodically with time $I_4 \cos \omega t/\omega C1$, is depicted as a cosine waveform 36B which lags the sine waveform, at terminal 29, FIG. 2D, by 90°.

The capacitor C1 is charged positive with respect to ground potential at a maximum rate when the positive-going slope of the waveform 36B is maximum, that is, during a positive-going portion of each cycle between a negative and a positive valley. Thus, the positive threshold triggering level of the transistor Q3 of, for example, +0.8 volt, is attained near the time a preselected one of the positive cycles of the waveform 36B reaches its positive peak. Typically, the threshold triggering level of the transistor Q3 is attained by applying an integral number of cycles of the time-varying waveform to the terminal 29 and is therefore illustrated as occurring near the peak of the third successive positive cycle. Since the waveform 36B is 90° out-of-phase with the sine wave at terminal 29, the triggering level of the transistor Q3 is crossed when the sine wave, FIG. 2D, passes through its axis of symmetry, which may be zero volts. Thus, by an excitation signal of some predetermined threshold level. If the excitation signal is below threshold level the display will not change state. To illustrate, assuming that the display takes the form of display tubes at 26A and 26B, respectively, and that each tube is a conventional decimal gas display tube incorporating 10 cathodes formed in the shape of 10 decimal numbers 0, 1...9, respectively, and an anode common to all cathodes in one tube which conditions its associated tube for firing upon receiving a positive excitation voltage of some predetermined magnitude greater than zero volts. If an excitation voltage of this magnitude is applied simultaneously to the anodes of both tubes one of the cathodes in each tube may be selected to fire by, for example, applying via the decode circuits 25A, 25B a pulse of ground potential to an appropriate end thereof. When the selected cathodes fire there is provided an illuminated and recognizable display of a decimal number equivalent to the count in the counting means 24. However, if the excitation signal is below the threshold level required to illuminate the display then the tubes will remain extinguished or "blanked."

Since gas display tubes incorporating anodes and cathodes require positive potential be applied to the anodes to condition the tube for firing, and inasmuch as a sinusoidal waveform applied to the terminal 29 is typically positive with respect to ground during only one half of each cycle, in order to prevent the application of a negative potential to the anodes of the display tubes the negative half-wave portions are cut off through half-wave rectification by the rectifier 39. It should be apparent, however, that in those instances where a reversal in polarity of the excitation signal will not have adverse effects on the components comprising display it may not be necessary to rectify the signal at the terminal 29.

The half-wave rectified output of the rectifier 39, FIG. 2E, comprises a sequence of positive time-varying pulses having peak amplitudes which exceed the minimum threshold firing or strobing level of the display and alternate portions of amplitude less than this firing or strobing level. These alternate portions are at least the DC portions of the waveform and may include portions of the positive time-varying pulses depending upon the minimum or threshold signal level required for illuminating the display. For example, as depicted by FIG. 2E, this minimum level may be between one-half and two-thirds of the peak amplitudes of the positive display excitation pulses. Accordingly, the display will be extinguished at least during each alternate half-cycle of excitation signal, FIG. 2B. Since there is no appreciable phase shift between the sine wave at the terminal 29, FIG. 2D, and the rectified display excitation waveform, FIG. 2E, the latter waveform will be at its minimum value of, for example, zero volts when the one-shot 20 is triggered into its stable or gate 22 enabling state, since it will be recalled that the one-shot is driven from its unstable state, FIG. 2F, at practically the same time the sine wave at terminal 29 crosses its axis of symmetry. With a 60 cycle AC sinusoidal voltage at the terminal 29 there will be at least an 8 millisecond interval when a positive excitation pulse is applied to the display during which time the one-shot 20 may remain in its stable state. This time interval is at least as long as the time intervals during which the counting means significantly changes state by counting clock pulses. Since the counting means does not change state significantly during an interval when the display is excited or strobed, there is provided a nonflickering representative presentation of the state of the now-stabilized counting means. If the counting means does not completely stabilize during the display interval there may be a slight change in the value of, for example, the unit's displayed number, but for all practical purposes the display remains persistent or nonflickering during each display interval.

As will be evident to those skilled in the art, the time-varying signal could have waveforms other than sinusoidal, such as rectangular, square, triangular or sawtooth; the time integration of such signals providing time-varying signals suitable for synchronizing the return of the monostable to its stable state with the display excitation waveform. Either of the latter waveforms may constitute the preferred excitation signal for certain types of displays, for instance, cathode-ray tube character displays.

What is claimed is:

1. A system for displaying the number of pulses counted by a display-driving counter during a time interval of interest as an illuminated digital representation thereof, the display being characterized as providing said illuminated representation when electrically excited beyond a predetermined threshold level, the system comprising, means for exciting the display with a periodic electrical signal having a first portion of amplitude less than said threshold level and a time duration at least equal to said time interval of interest, said signal having a second portion succeeding said first portion of amplitude at least equal to said threshold level, and means including an integrating means coupled to the exciting means for supplying timing pulses to said counter only during said time duration, said integrating means being synchronized to said first portion of said periodic electrical signal so that said counter counts the number of pulses received in said time interval while said display is extinguished by said first portion of said electrical signal.

2. A system for synchronizing the excitation of a display to a display-driving apparatus comprising, a source of a time-varying signal having a waveform portion for exciting the display to provide the desired output, monostable means including a storage circuit and characterized as having stable and unstable states and wherein the time during which said monostable means remains in the unstable state is determined at least in part by the time required to charge said storage circuit to a predetermined level, said monostable means assuming a stable state when said predetermined level is attained, means for changing the state of said apparatus coupled to said monostable means and controlled thereby such that said apparatus changes state when said monostable means is in the stable state, means coupling said source of time-varying signal to said storage circuit for charging said storage circuit at a rate controlled at least in part by said time-varying signal, the charging of said storage circuit to said predetermined level occurring substantially at the termination of said waveform portion of said time-varying signal, and means for applying the time-varying signal to the display so that the display is excited when said monostable means is in said unstable state.

3. A system for synchronizing the excitation of a display to a display-driving counter comprising, a source of a time-varying signal having a first portion for exciting the display and a second portion for extinguishing the display a monostable device characterized as having stable and unstable states and wherein the time during which the device remains in the unstable state is determined at least in part by the time required to charge a capacitor to a predetermined level, said device assuming a stable state said predetermined level is attained, a source of timing pulses coupled to said counter, said device being coupled to said source to control the application of pulses to said counter such that said pulses are applied to said counter only when said device is in the stable state, means coupling said source to said capacitor for charging said capacitor at rates controlled at least in part by said time-varying signal, so tat the charging of said capacitor to said predetermined level occurs substantially at the termination of said first portion of said time-varying signal, and means for applying the time-varying signal to the display so that the display is excited by said first portion thereof when said device is in said unstable state.

4. The system as claimed in clam 3 wherein said means for charging said capacitor includes a resistor and wherein said capacitor and resistor form an integrator for said time-varying signal.

5. The system as claimed in claim 3 wherein said source of time-varying signals a sinusoidal signal source and said time-varying signal is a sinusoidal signal, and which further comprises, rectifying means coupled between said source and said display.